United States Patent
Ito et al.

(10) Patent No.: US 11,569,766 B2
(45) Date of Patent: Jan. 31, 2023

(54) DRIVE UNIT

(71) Applicant: EXEDY Corporation, Neyagawa (JP)

(72) Inventors: Junichi Ito, Neyagawa (JP); Hitoshi Katsura, Neyagawa (JP); Taichi Kitamura, Neyagawa (JP); Chika Baba, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 37 days.

(21) Appl. No.: 17/336,678

(22) Filed: Jun. 2, 2021

(65) Prior Publication Data

US 2022/0006402 A1  Jan. 6, 2022

(30) Foreign Application Priority Data

Jul. 2, 2020  (JP) .............................. JP2020-114620

(51) Int. Cl.
*H02P 1/04* (2006.01)
*H02P 7/29* (2016.01)
*B60L 15/20* (2006.01)

(52) U.S. Cl.
CPC ............... *H02P 7/29* (2013.01); *B60L 15/20* (2013.01); *B60L 2200/30* (2013.01); *B60L 2200/34* (2013.01); *B60L 2200/44* (2013.01); *B60L 2240/421* (2013.01); *B60L 2240/425* (2013.01); *B60L 2240/429* (2013.01); *B60L 2240/80* (2013.01)

(58) Field of Classification Search
CPC .......... H02P 27/08; H02P 6/28; H02P 27/085; H02P 7/29; G05B 19/0425; B60L 15/20; B60L 2240/421; B60L 2240/425; B60L 2240/429; B60L 2240/80
See application file for complete search history.

(56) References Cited

U.S. PATENT DOCUMENTS

2018/0354108 A1 * 12/2018 Lee .................. B25B 23/147
2021/0175833 A1 *  6/2021 Shaske ............... H02P 29/027

FOREIGN PATENT DOCUMENTS

| CN | 107294463 A | * | 10/2017 |
| JP | 2014-512307 A | | 5/2014 |
| WO | 2012/145252 A1 | | 10/2012 |

* cited by examiner

*Primary Examiner* — Karen Masih
(74) *Attorney, Agent, or Firm* — United IP Counselors, LLC

(57) ABSTRACT

A drive unit attached to a mobile entity is disclosed. The drive unit includes a motor, a first detector, and a controller. The first detector detects vehicle speed information regarding a vehicle speed of the mobile entity. The controller performs PWM control for the motor. The controller controls a duty cycle of a PWM signal in accordance with the vehicle speed information detected by the first detector.

8 Claims, 10 Drawing Sheets

DRIVE UNIT

CROSS-REFERENCE TO RELATED APPLICATIONS

This application claims priority to Japanese Patent Application No. 2020-114620, filed Jul. 2, 2020. The entire contents of that application are incorporated by reference herein in their entirety.

TECHNICAL FIELD

The present invention relates to a drive unit.

BACKGROUND ART

It has been proposed to enhance the performance of a mobile entity such as a hand pallet jack or truck, a cart, or a wheelchair by attaching a drive unit thereto. The drive unit includes a motor for diving and rotating a wheel (see Japanese translation of PCT International Application Publication No. 2014-512307). The motor has characteristics that the maximum output torque thereof reduces with increase in rotational speed thereof and that the maximum output torque thereof increases with reduction in rotational speed thereof.

The drive unit described above outputs a high torque in starting when the motor is driven with the maximum performance. Hence, it is concerned that abrupt acceleration or slippage of a drive unit undesirably occurs in starting. When the output torque of the motor is inhibited by uniformly limiting a drive voltage value (or a current value as the result thereof) so as to prevent the concerns, this results in a drawback that the maximum rotational speed of the motor is undesirably reduced as well. Because of this, it has been demanded to control the output torque of the motor as appropriately as possible.

BRIEF SUMMARY

It is an object of the present invention to provide a drive unit capable of appropriately controlling an output torque of a motor.

A drive unit according to an aspect of the present invention is a type of drive unit attached to a mobile entity and includes a motor, a first detector, and a controller. The first detector detects vehicle speed information regarding a vehicle speed of the mobile entity. The controller performs PWM control for the motor. The controller controls a duty cycle of a PWM signal in accordance with the vehicle speed information detected by the first detector.

According to the configuration, the controller controls the duty cycle of the PWM signal in accordance with the vehicle speed information. Hence, the controller is capable of controlling the duty cycle, for instance, such that the duty cycle increases with increase in rotational speed of the motor. Because of this, when the rotational speed of the motor is low, the duty cycle becomes small, whereby an output torque becomes small as well. Therefore, it is possible to inhibit drawbacks of abrupt acceleration and slippage of a drive wheel in starting. Besides, when the rotational speed of the motor is high, the duty cycle becomes large, whereby it is also possible to prevent reduction in maximum rotational speed of the motor. Based on the above, the drive unit described above is capable of appropriately controlling the output torque of the motor.

Preferably, the controller increases the duty cycle with increase in a rotational speed of the motor.

Preferably, the first detector detects the rotational speed of the motor as the vehicle speed information.

Preferably, the controller selectively executes a first mode and a second mode. The controller performs control of increasing or reducing the duty cycle in accordance with the vehicle speed information in executing the first mode. Besides, the controller performs control of making the duty cycle constant regardless of the vehicle speed information in executing the second mode.

Preferably, the drive unit further includes a second detector. The second detector is configured to detect a current of the motor. The controller corrects the duty cycle in accordance with the current of the motor detected by the second detector.

Preferably, the drive unit further includes a third detector. The third detector is configured to detect a temperature of the motor. The controller corrects the duty cycle in accordance with the temperature of the motor detected by the third detector.

Preferably, the drive unit further includes a fourth detector. The fourth detector is configured to detect a weight of an object put on the mobile entity. The controller corrects the duty cycle in accordance with the weight detected by the fourth detector.

Preferably, the drive unit further includes a correction value input device. The correction value input device is operated by a user. The controller corrects the duty cycle in accordance with an operating amount of the correction value input device.

Preferably, the drive unit further includes a motor driver. The controller controls the motor through the motor driver.

Overall, according to the present invention, an output torque of a motor can be appropriately controlled.

DETAILED DESCRIPTION

A drive unit 100 according to the present preferred embodiment will be hereinafter explained with reference to drawings. The drive unit 100 is attached to a mobile entity. A hand pallet jack or truck, a cart, an automated guided vehicle, a wheelchair, a kick board, or so forth can be exemplified as the mobile entity. The mobile entity is configured to transport an object. It should be noted that the term "object" is conceptualized as encompassing a person or so forth as well. The mobile entity includes, for instance, a wheel.

<Drive Unit>

Figure 1:
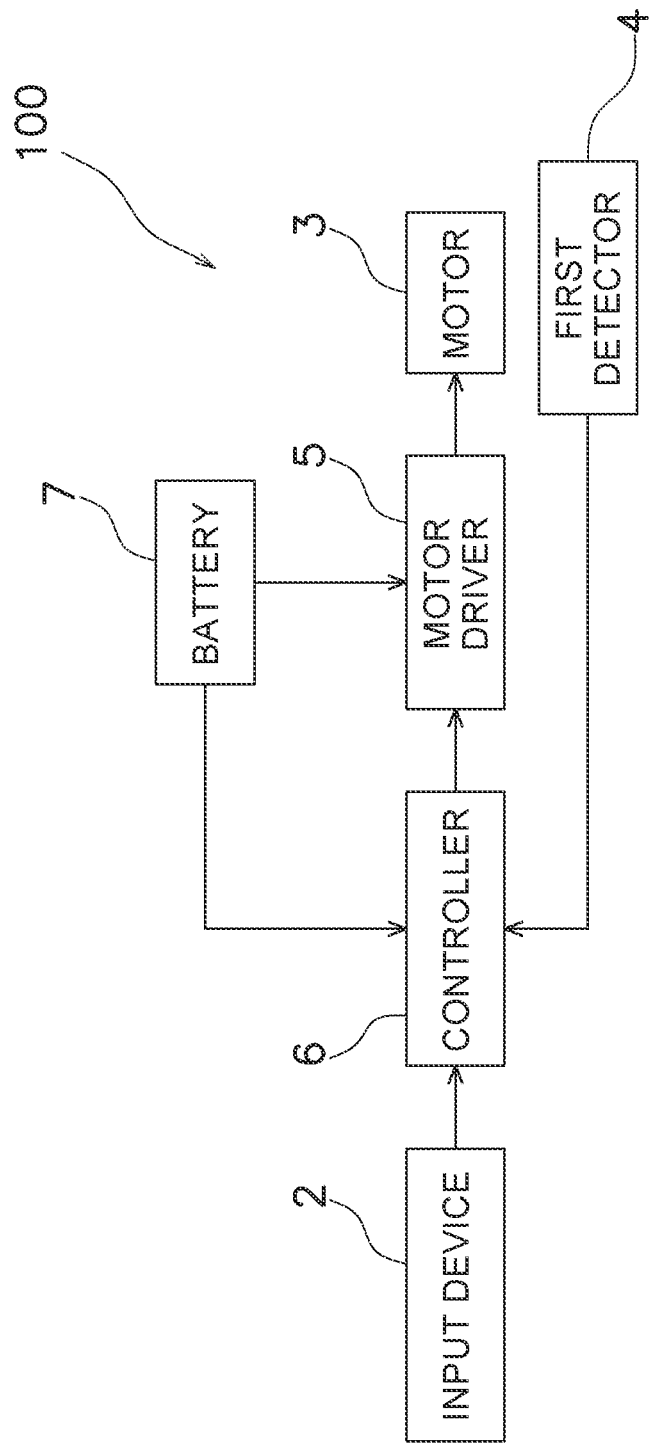
FIG. 1 is a block diagram of a drive unit.

As shown in FIG. 1, the drive unit 100 includes an input device 2, a motor 3, a first detector 4, a motor driver 5, and a controller 6. Besides, the drive unit 100 includes a battery 7 and a drive wheel (not shown in the drawings).

<Input Device>

The input device 2 is, for instance, an on/off switch. When operated by a user, the input device 2 outputs an on/off signal to the controller 6. As a result, the motor 3 is driven or stopped.

<Motor>

The motor 3 is configured to drive and rotate the drive wheel of the drive unit 100. The motor 3 is supplied with electric power from the battery 7 through the motor driver 5. The motor 3 is driven in accordance with voltage and current outputted from the motor driver 5.

<First Detector>

The first detector 4 is configured to detect vehicle speed information regarding the vehicle speed of the mobile entity. The first detector 4 detects, for instance, the rotational speed of the motor 3. The first detector 4 is composed of, for instance, a rotary encoder and so forth. The first detector 4 outputs the vehicle speed information to the controller 6. It should be noted that the first detector 4 can output the vehicle speed information to the controller 6 through the motor driver 5. The first detector 4 can be embedded in the motor 3.

<Motor Driver>

The motor driver 5 is electrically connected to the motor 3, the controller 6, and the battery 7. The motor driver 5 outputs the current and voltage, inputted thereto from the battery 7, to the motor 3. The motor driver 5 drives the motor 3 based on a command signal inputted thereto from the controller 6. When described in detail, the motor driver 5 receives the command signal from the controller 6 and regulates and outputs the voltage and current to the motor 3 in accordance with the command signal.

<Controller>

The controller 6 performs PWM control for the motor 3. The controller 6 controls a duty cycle of a PWM signal in accordance with the vehicle speed information detected by the first detector 4. Specifically, the controller 6 increases the duty cycle with increase in rotational speed of the motor 3.

When obtaining the on signal from the input device 2, the controller 6 executes a first mode. In executing the first mode, the controller 6 performs control of increasing or reducing the duty cycle in accordance with the vehicle speed information.

Figure 2:
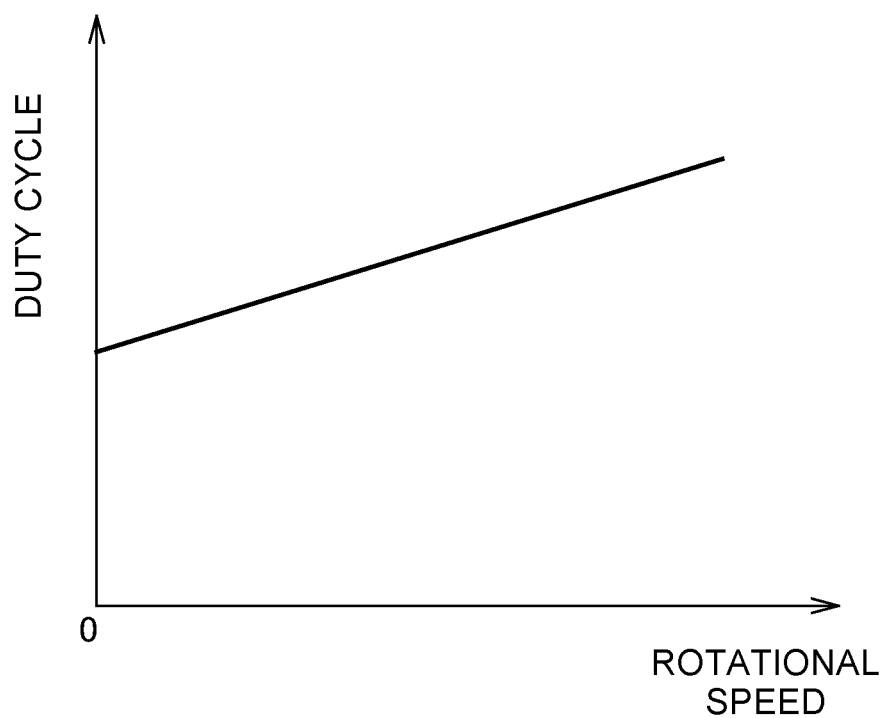
FIG. 2 is a chart showing a relation between rotational speed and duty cycle.

The controller 6 computes the duty cycle of the PWM signal based on the vehicle speed information. It should be noted that as shown in FIG. 2, for instance, the controller 6 can set the duty cycle to increase with increase in rotational speed of the motor 3. For example, an increase rate of the duty cycle is constant. In other words, the duty cycle linearly increases. It should be noted that the increase rate of the duty cycle may not be constant. For example, the increase rate of the duty cycle can increase with increase in rotational speed or can reduce with increase in rotational speed.

As shown in FIG. 1, the controller 6 computes the duty cycle as described above and outputs the computing result as the command signal to the motor driver 5. The motor driver 5 outputs the voltage and current to the motor 3 based on the duty cycle calculated by the controller 6.

When obtaining the off signal from the input device 2, the controller 6 stops electric driving of the motor 3. In other words, the controller 6 stops outputting the voltage and current to the motor 3 from the motor driver 5.

For example, a computer (e.g., microcomputer), including a CPU (Central Processing Unit), a ROM (Read Only Memory), and so forth, is provided as the controller 6. The ROM stores a program for computing the duty cycle of the PWM signal. The CPU executes the program stored in the ROM.

<Actions of Controller>

Figure 3:
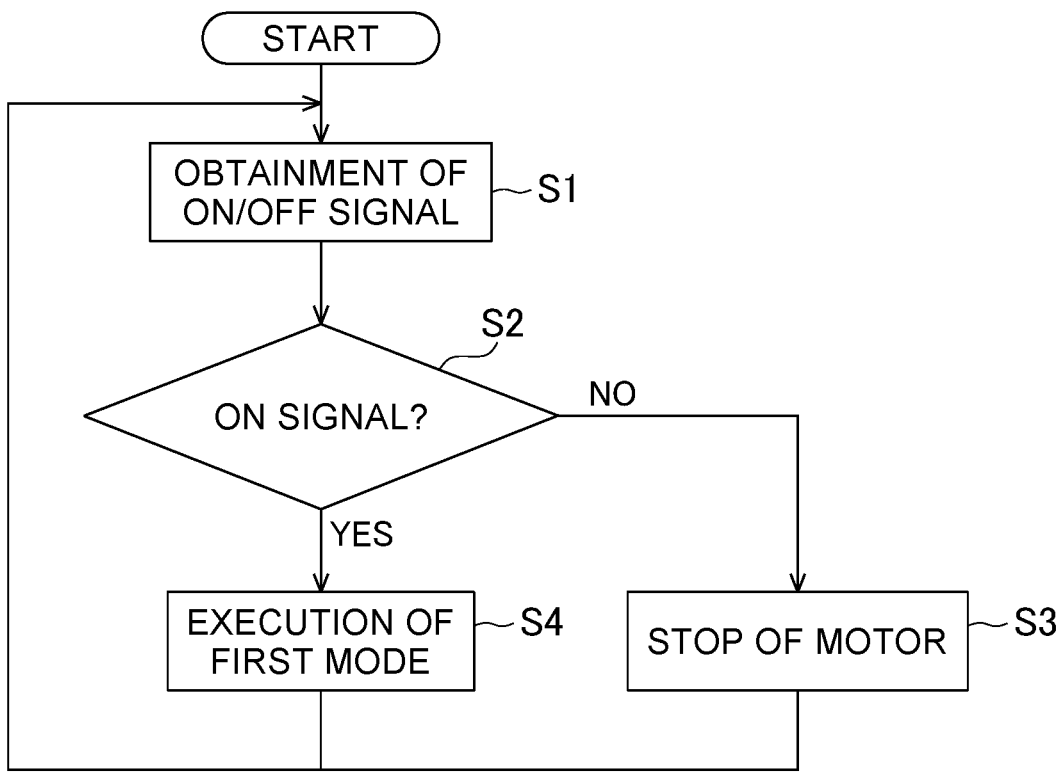
FIG. 3 is a flowchart showing an example of processing steps executed by a controller.

Next, an example of processing steps executed by the controller 6 will be explained with reference to flowcharts shown in FIGS. 3 and 4.

First, the controller 6 obtains an on/off signal from the input device 2 (step S1). Then, the controller 6 determines whether or not the on/off signal obtained from the input device 2 is an on signal (step S2).

When determining that the on/off signal obtained from the input device 2 is not the on signal but an off signal (No in step S2), the controller 6 stops electric driving of the motor 3 (step S3). When described in detail, the controller 6 stops outputting voltage and current to the motor 3 from the motor driver 5. It should be noted that when the motor 3 has been already stopped, the controller 6 keeps the motor 3 stopped.

Contrarily, when determining that the on/off signal obtained from the input device 2 is the on signal (Yes in step S2), the controller 6 executes the first mode (step S4).

Figure 4:
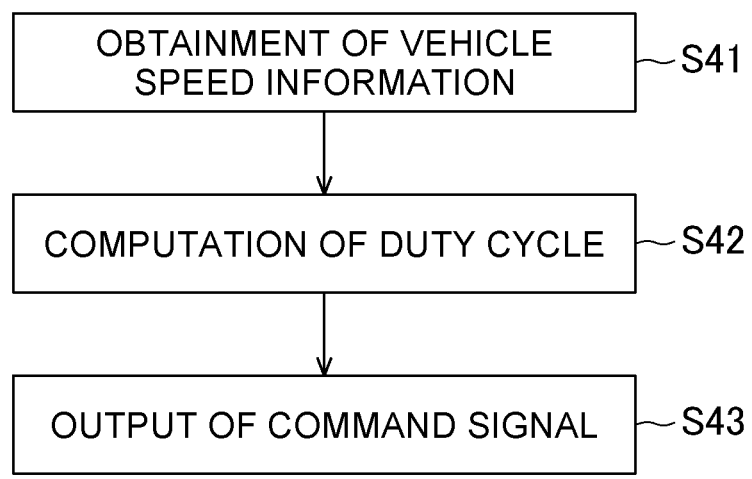
FIG. 4 is a flowchart showing an example of processing steps executed by the controller.

As shown in FIG. 4, in executing the first mode, the controller 6 executes the following processing steps. First, the controller 6 obtains vehicle speed information detected by the first detector 4 (step S41). The controller 6 can obtain the vehicle speed information either directly from the first detector 4 or indirectly through the motor driver 5.

Next, the controller 6 computes a duty cycle based on the obtained vehicle speed information (step S42). Specifically, the controller 6 computes the duty cycle based on a function, a table, or so forth that shows a relation between the rotational speed of the motor 3 and the duty cycle.

Then, the controller 6 outputs a command signal to the motor driver 5 such that the motor 5 outputs the voltage and current to the motor 3 based on the computed duty cycle (step S43).

Figure 5:
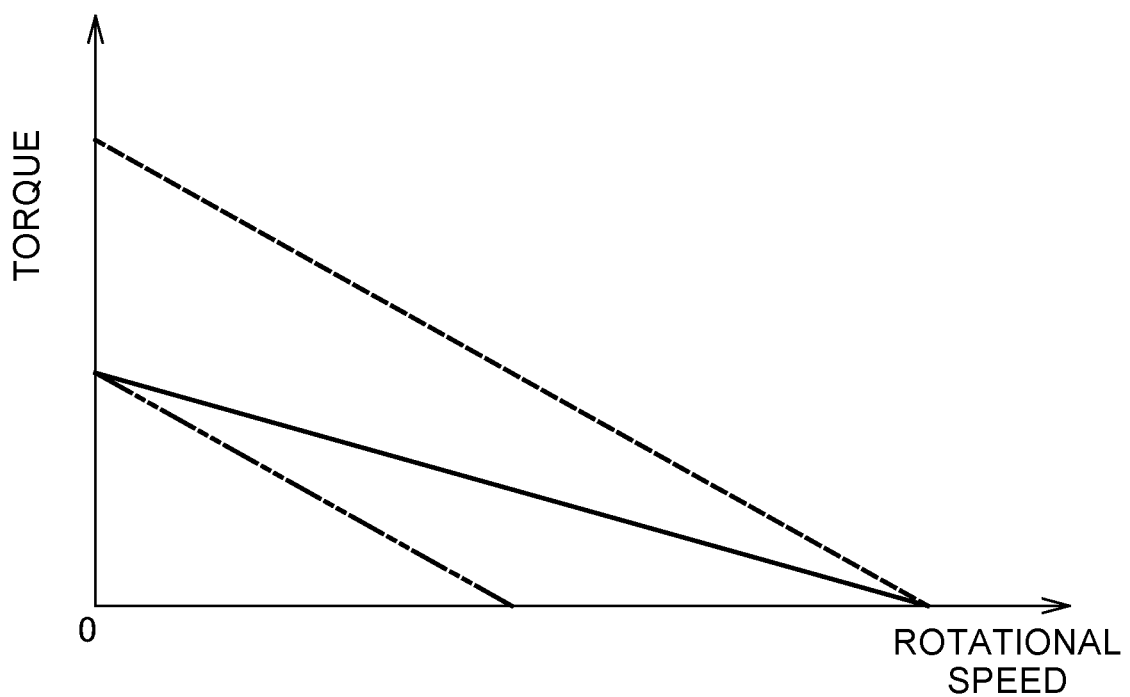
FIG. 5 is a chart showing a relation between rotational speed and torque.

According to the drive unit 100 configured as described above, the following advantageous effects can be achieved as shown in FIG. 5. It should be noted that FIG. 5 is a chart showing a relation between the rotational speed of the motor 3 and the output torque of the motor 3.

In FIG. 5, a dotted line indicates the relation between rotational speed and torque in a condition that the motor 3 is driven while the duty cycle is kept constant (at a duty cycle of, e.g., 100%) without being controlled. The motor 3 is rotated at the maximum torque when the rotational speed is low, i.e., in starting. Because of this, it is concerned that drawbacks such as abrupt acceleration and slippage occur.

In view of this, when the duty cycle is uniformly reduced (to, e.g., 50%), the relation between rotational speed and torque is obtained as depicted with a dashed two-dotted line in FIG. 5. By thus reducing the duty cycle, the torque can be also reduced in starting. Hence, abrupt acceleration and slippage can be prevented in starting. On the other hand, a drawback occurs that the maximum rotational speed is undesirably reduced as well.

By contrast, in the drive unit 100 according to the present preferred embodiment, the controller 6 controls the duty cycle in accordance with the rotational speed of the motor 3. Because of this, when the rotational speed of the motor 3 is low, the duty cycle is reduced to reduce the output torque, whereby it is possible to inhibit abrupt acceleration, slippage of the drive wheel, and so forth in starting. Besides, the duty cycle can be increased with increase in rotational speed of the motor 3, whereby it is also possible to prevent reduction in maximum rotational speed of the motor 3. In summary, in the drive unit 100 according to the present preferred embodiment, the relation between the rotational speed of the motor 3 and the output torque of the motor 3 is obtained as depicted with a solid line in FIG. 5.

[Modifications]

One preferred embodiment of the present invention has been explained above. However, the present invention is not limited to the above, and a variety of changes can be made without departing from the gist of the present invention. It should be noted that modifications described below can be arbitrarily combined in a suitable manner.

Modification 1

The controller 6 can selectively execute a first mode and a second mode. A user selects one of a plurality of modes through the input device 2. For example, the user selects one of an off mode, the first mode, and the second mode. When the user operates the input device 2, the input device 2 outputs a mode selection signal to the controller 6. It should be noted that when the off mode is selected, electric driving of the motor 3 is stopped.

When the user selects the first mode, the controller 6 executes the first mode in a similar manner to the preferred embodiment described above.

On the other hand, when the user selects the second mode, the controller 6 executes the second mode. In executing the second mode, the controller 6 performs control of making the duty cycle constant regardless of vehicle speed information. In other words, the controller 6 does not execute such duty cycle computation as done in executing the first mode. The controller 6 outputs a command signal to the motor driver 5 such that the duty cycle is made constant regardless of the vehicle speed information. The motor driver 5 outputs voltage and current to the motor 3 at a constant duty cycle (of, e.g., 100%) based on the command instructed by the controller 6.

Figure 6:
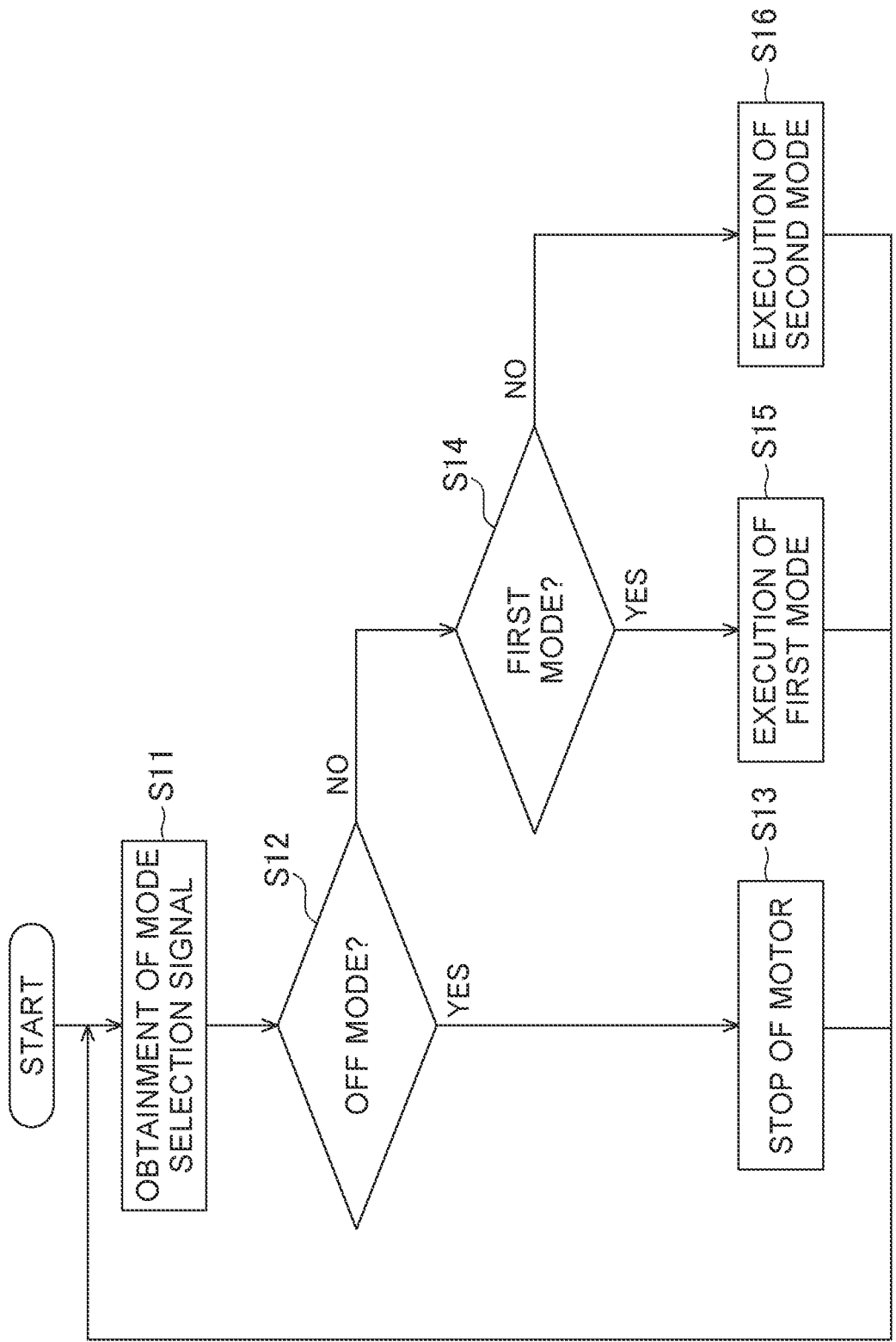
FIG. 6 is a flowchart showing an example of processing steps executed by the controller according to a modification.

FIG. 6 is a flowchart showing an example of processing steps executed by the controller 6 in modification 1. As shown in FIG. 6, the controller 6 obtains a mode selection signal from the input device 2 (step S11).

The controller 6 determines whether or not the mode selection signal indicates the off mode (step S12). When determining that the mode selection signal indicates the off mode (Yes in step S12), the controller 6 stops the motor 3 (step S13).

When determining that the mode selection signal does not indicate the off mode (No in step S12), the controller 6 determines whether or not the mode selection signal indicates the first mode (step S14).

When determining that the mode selection signal indicates the first mode (Yes in step S14), the controller 6 executes the first mode (step S15).

Contrarily, when determining that the mode selection signal does not indicate the first mode (No in step S14), the controller 6 executes the second mode (step S16). In other words, the controller 6 outputs a command signal to the motor driver 5 such that voltage and current are outputted at a predetermined duty cycle without executing duty cycle computation.

It should be noted that the controller 6 can selectively execute a third mode in addition to the first and second modes. In executing the third mode, the controller 6 executes similar processing steps to those in executing the second mode. It should be noted that the duty cycle is smaller in the third mode than in the second mode.

Modification 2

Figure 7:
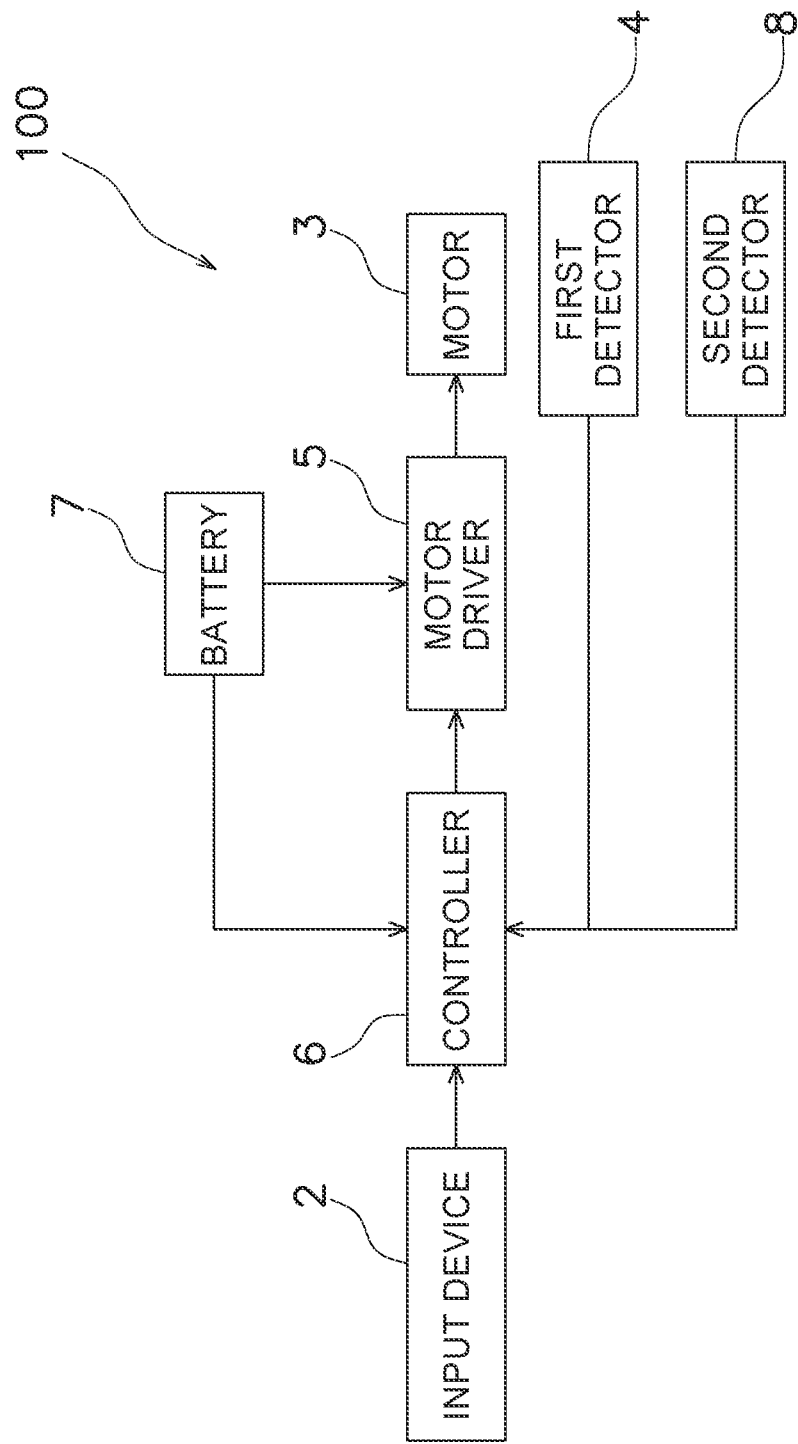
FIG. 7 is a block diagram of a drive unit according to another modification.

In the preferred embodiment described above, the controller 6 controls the duty cycle based on only the rotational speed of the motor 3. However, the configuration of the drive unit 100 is not limited to this. For example, as shown in FIG. 7, the drive unit 100 can further include a second detector 8. The second detector 8 is configured to detect the current of the motor 3. The second detector 8 outputs information regarding the detected current of the motor 3 to the controller 6.

The controller 6 corrects the duty cycle in accordance with the current of the motor 3 detected by the second detector 8. When described in detail, the controller 6 firstly computes the duty cycle in accordance with the rotational speed of the motor 3. Then, the controller 6 corrects the computed duty cycle in accordance with the current of the motor 3.

For example, the controller 6 is capable of correcting the duty cycle such that the duty cycle increases with reduction in current of the motor 3. Alternatively, the controller 6 can correct the duty cycle such that the duty cycle increases only when the current of the motor 3 is less than or equal to a predetermined threshold.

Modification 3

Figure 8:
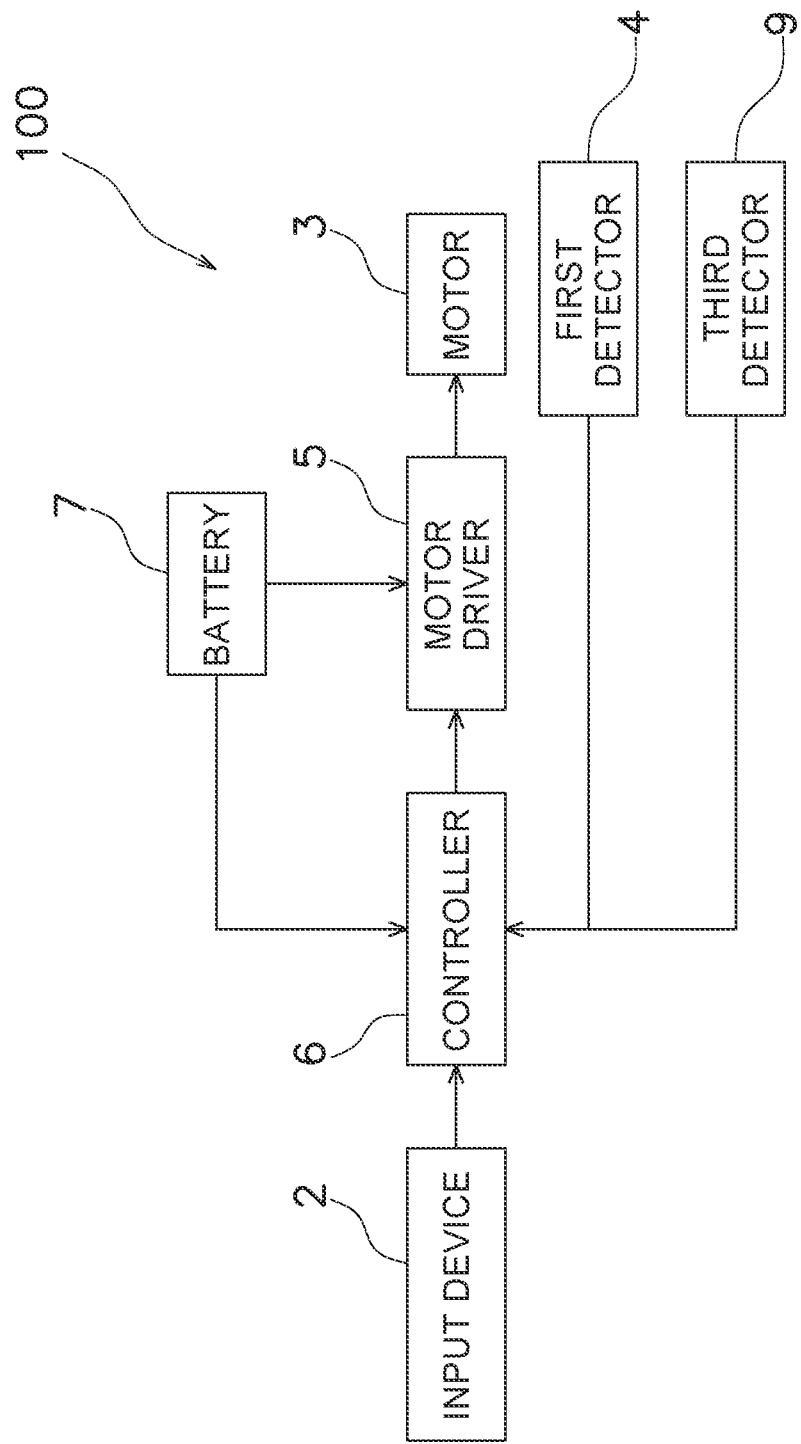
FIG. 8 is a block diagram of a drive unit according to yet another modification.

As shown in FIG. 8, the drive unit 100 can further include a third detector 9. The third detector 9 is configured to detect the temperature of the motor 3. The third detector 9 outputs information regarding the detected temperature of the motor 3 to the controller 6.

The controller 6 corrects the duty cycle in accordance with the temperature of the motor 3 detected by the third detector 9. When described in detail, the controller 6 firstly computes the duty cycle in accordance with the rotational speed of the motor 3. Then, the controller 6 corrects the computed duty cycle in accordance with the temperature of the motor 3.

For example, the controller 6 is capable of correcting the duty cycle such that the duty cycle reduces with reduction in temperature of the motor 3. Alternatively, the controller 6 can correct the duty cycle such that the duty cycle increases with reduction in temperature of the motor 3.

Yet alternatively, the controller 6 can correct the duty cycle such that the duty cycle reduces only when the temperature of the motor 3 is greater than or equal to a predetermined threshold. Still alternatively, the controller 6 can correct the duty cycle such that the duty cycle increases only when the temperature of the motor 3 is less than or equal to a predetermined threshold.

Modification 4

Figure 9:
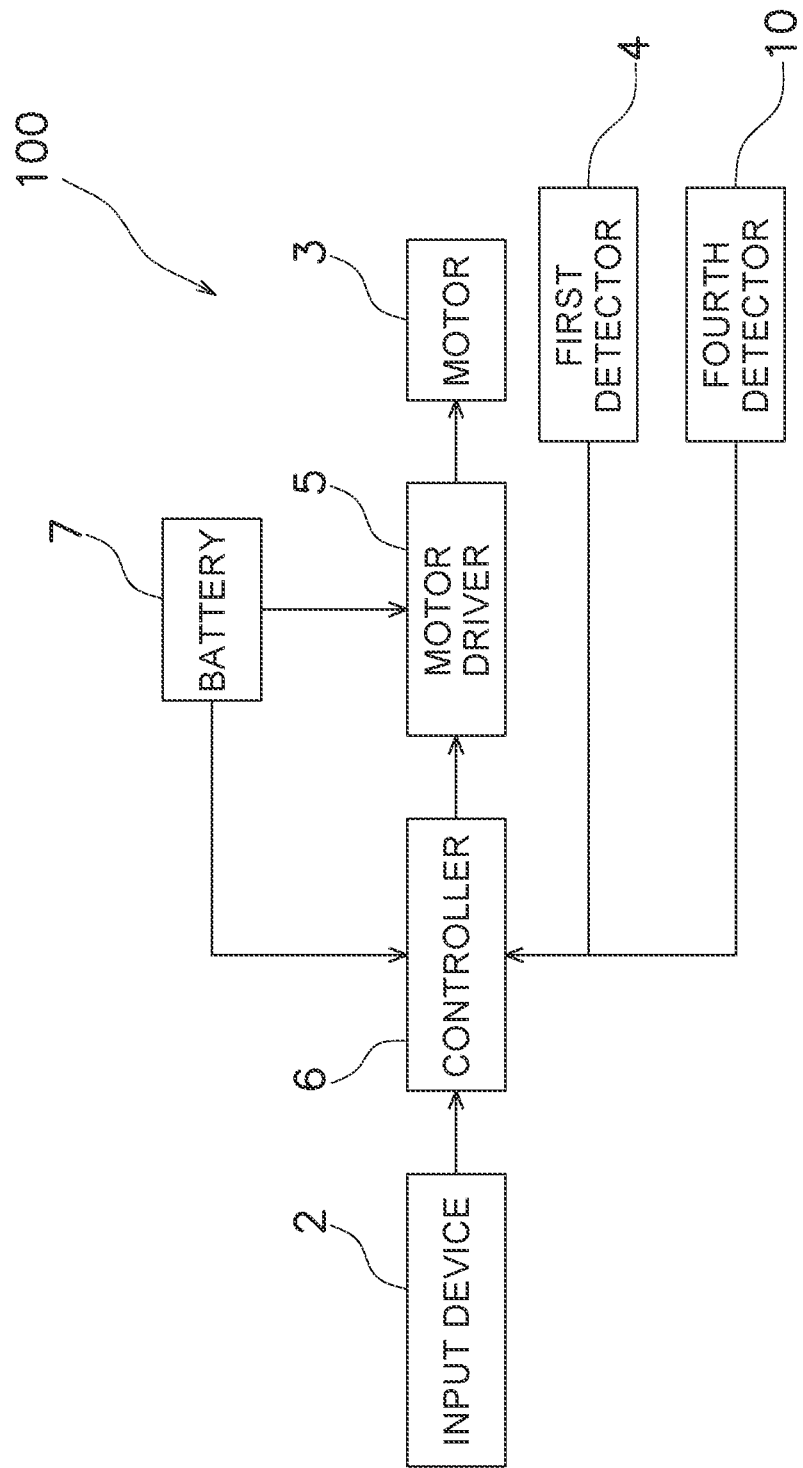
FIG. 9 is a block diagram of a drive unit according to still another modification.

As shown in FIG. 9, the drive unit 100 can further include a fourth detector 10. The fourth detector 10 is configured to detect the weight of an object put on the mobile entity. The fourth detector 10 outputs information regarding the detected weight of the object to the controller 6. It should be noted that the term "object put on the mobile entity" is conceptualized as encompassing not only an object to be transported by a hand pallet jack or truck or a cart but also a person riding on a wheelchair or a kick board.

The controller 6 corrects the duty cycle in accordance with the weight of the object detected by the fourth detector 10. When described in detail, the controller 6 firstly computes the duty cycle in accordance with the rotational speed of the motor 3. Then, the controller 6 corrects the computed duty cycle in accordance with the weight of the object.

For example, the controller 6 is capable of correcting the duty cycle such that the duty cycle increases with increase in weight of the object.

Modification 5

Figure 10:
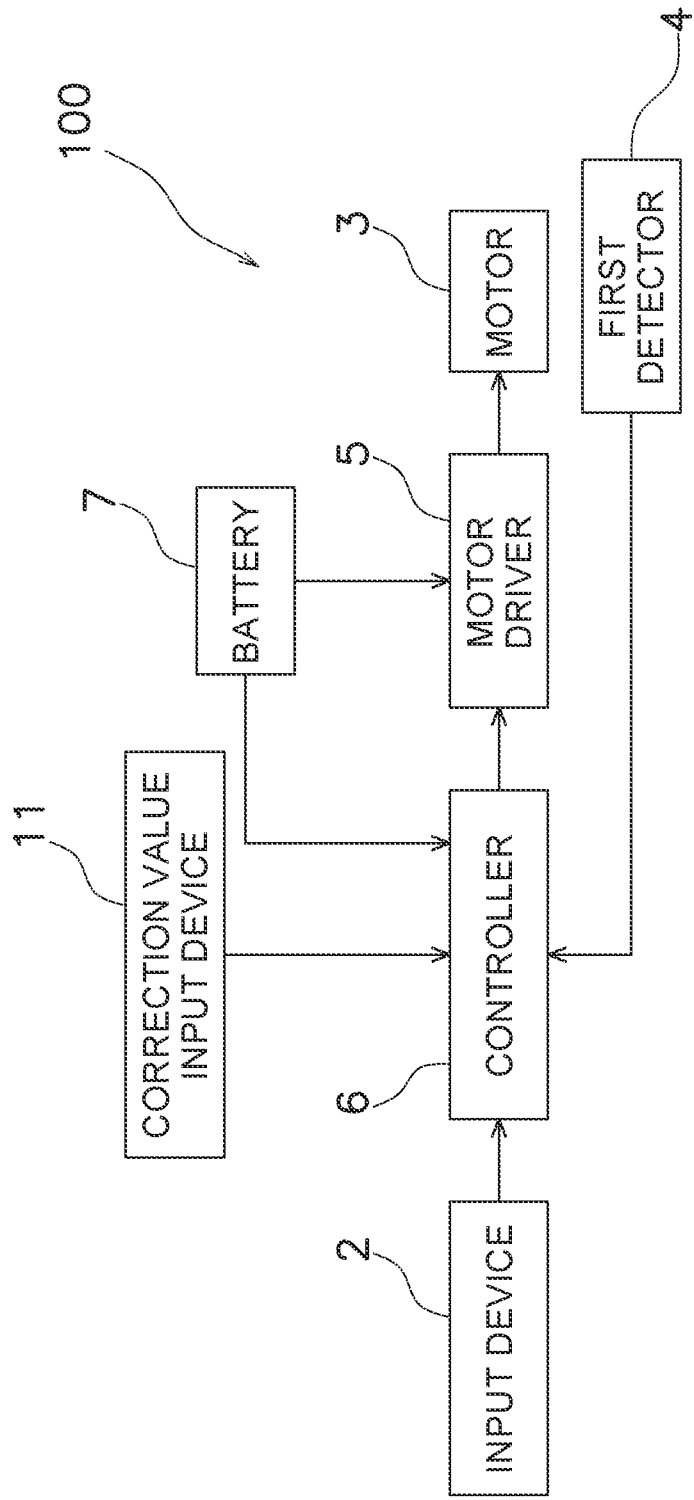
FIG. 10 is a block diagram of a drive unit according to yet still another modification.

As shown in FIG. 10, the drive unit 100 can further include a correction value input device 11. For example, a lever can be employed as the correction value input device 11. The correction value input device 11 is regulated in operating amount when operated by a user, whereby the duty cycle can be corrected.

When described in detail, the controller 6 firstly computes the duty cycle in accordance with the rotational speed of the motor 3. Then, the controller 6 corrects the duty cycle in accordance with the operating amount of the correction value input device 11. For example, the controller 6 corrects the duty cycle such that the duty cycle increases with increase in operating amount of the correction value input device 11. It should be noted that the correction value input device 11 can be configured to be increased or reduced continuously in operating amount, or alternatively, can be configured to be increased or reduced stepwise in operating amount.

Modification 6

The vehicle speed information detected by the first detector 4 may not be the rotational speed of the motor 3. For example, the first detector 4 can be an acceleration sensor. The controller 6 can compute the vehicle speed based on the acceleration of the mobile entity detected by the acceleration sensor and control the duty cycle in accordance with the computed vehicle speed.

REFERENCE SIGNS LIST

2 Input device
3 Motor
4 First detector
5 Motor driver
6 Controller
8 Second detector
9 Third detector
10 Fourth detector
11 Correction value input device
100 Drive unit

What is claimed is:

1. A drive unit attached to a mobile entity, the drive unit comprising:
   a motor;
   a first detector configured to detect vehicle speed information regarding a vehicle speed of the mobile entity; and
   a controller configured to perform PWM control for the motor, the controller further configured to control a duty cycle of a PWM signal in accordance with the vehicle speed information detected by the first detector, the controller being further configured to selectively execute a first mode and a second mode, the controller performing control of increasing or reducing the duty cycle in accordance with the vehicle speed information in the first mode, the controller performing control of making the duty cycle constant regardless of the vehicle speed information in the second mode.

2. The drive unit according to claim 1, wherein the controller is further configured to increase the duty cycle with increase in a rotational speed of the motor.

3. The drive unit according to claim 1, wherein the first detector is further configured to detect a rotational speed of the motor as the vehicle speed information.

4. The drive unit according to claim 1, further comprising:
   a second detector configured to detect a current of the motor, wherein
   the controller is further configured to correct the duty cycle in accordance with the current of the motor detected by the second detector.

5. The drive unit according to claim 1, further comprising:
   a motor driver, wherein
   the controller is further configured to control the motor through the motor driver.

6. A drive unit attached to a mobile entity, the drive unit comprising:
   a motor;
   a first detector configured to detect vehicle speed information regarding a vehicle speed of the mobile entity;
   a temperature detector configured to detect a temperature of the motor; and
   a controller configured to perform PWM control for the motor, the controller further configured to control a duty cycle of a PWM signal in accordance with the vehicle speed information detected by the first detector, the controller being further configured to correct the duty cycle in accordance with the temperature of the motor detected by the temperature detector.

7. A drive unit attached to a mobile entity, the drive unit comprising:
   a motor;
   a first detector configured to detect vehicle speed information regarding a vehicle speed of the mobile entity;
   a weight detector configured to detect a weight of an object put on the mobile entity; and
   a controller configured to perform PWM control for the motor, the controller further configured to control a duty cycle of a PWM signal in accordance with the vehicle speed information detected by the first detector, the controller being further configured to correct the duty cycle in accordance with the weight detected by the weight detector.

8. A drive unit attached to a mobile entity, the drive unit comprising:
   a motor;
   a first detector configured to detect vehicle speed information regarding a vehicle speed of the mobile entity;
   a controller configured to perform PWM control for the motor, the controller further configured to control a duty cycle of a PWM signal in accordance with the vehicle speed information detected by the first detector; and
   a correction value input device operated by a user, the controller being further configured to correct the duty cycle in accordance with an operating amount of the correction value input device.

* * * * *